(12) United States Patent
Luce et al.

(10) Patent No.: US 6,543,489 B1
(45) Date of Patent: Apr. 8, 2003

(54) UNITARY REDUCTION DUCT

(75) Inventors: Clair A. Luce, Burgaw, NC (US);
Ronald D. Shuck, Hattiesburg, MS (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 10/136,945

(22) Filed: May 1, 2002

(51) Int. Cl.[7] .................................................. F16L 9/00
(52) U.S. Cl. .................. 138/156; 138/159; 285/148.24; 285/424
(58) Field of Search .............................. 138/156, 159, 138/157; 285/424, 417, 148.18, 148.23, 148.24, 114

(56) References Cited

U.S. PATENT DOCUMENTS

| | | | | |
|---|---|---|---|---|
| 1,205,132 A | * | 11/1916 | Black | 285/148.24 |
| 1,280,312 A | * | 10/1918 | Scherer | 285/148.24 |
| 1,455,027 A | * | 5/1923 | Ludwig | 285/148.24 |
| 4,093,282 A | * | 6/1978 | Kyriakodis | 285/114 |
| 4,418,943 A | * | 12/1983 | Ionna | 285/12 |
| 5,391,064 A | * | 2/1995 | Lopez | 417/423.14 |
| 5,741,029 A | * | 4/1998 | Wilson | 285/114 |
| 6,244,633 B1 | * | 6/2001 | Warren | 285/424 |

* cited by examiner

*Primary Examiner*—Patrick Brinson
(74) *Attorney, Agent, or Firm*—William J. Davis; Philip Braginsky

(57) ABSTRACT

A unitary annular reduction duct suitable for joining pipes comprising an annular entrance collar of a given diameter, a corrugated and gradually inwardly tapered reduction portion that is contiguous with the collar section and a corrugated and substantially vertical annular exit portion contiguous with the reduction portion whereby the reduction portion has a diameter less than the collar section. The reduction duct may also be used to join pipes of different shapes.

9 Claims, 2 Drawing Sheets

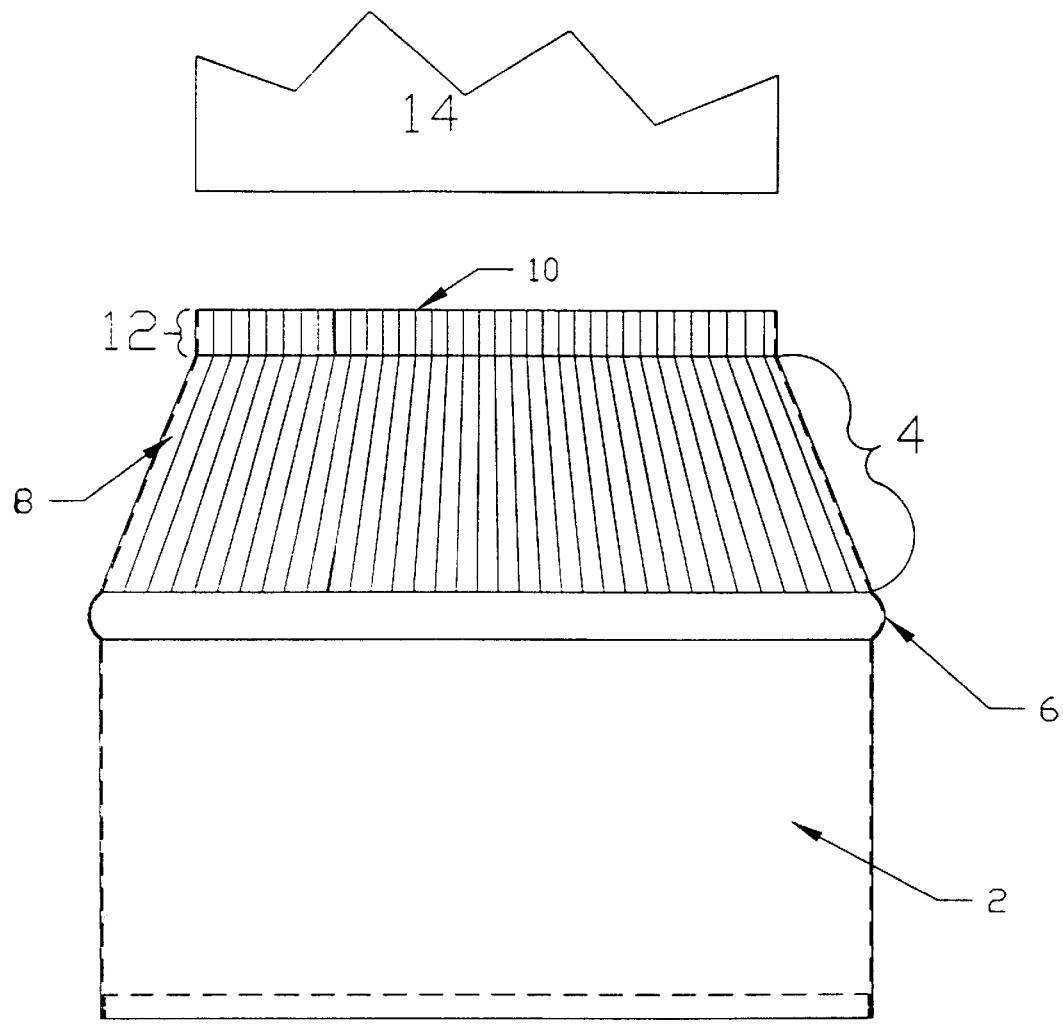
FIGURE #2

UNITARY REDUCTION DUCT

BACKGROUND OF THE INVENTION

Multi-membered reduction sheet metal ducts for transport of gaseous materials are known; however such ducts are relatively expensive to manufacture due to waste resulting from the cutting of separate pieces of sheet metal as well as the time and technique required to assemble the individual pieces. Further, these multiple piece units are subject to excessive gas leakage through the assembled joints unless further expense is incurred by welding or otherwise sealing the end margins of the joined members. Additionally, the lack of rigidity and strength associated with these multiple piece reduction devices makes them subject to rupture during intermittent surges in gas flow velocity.

Accordingly it is an object of this invention to overcome the above disadvantages by providing a stronger reduction device while eliminating the expense of cutting, assembling and welding separate pieces.

These and other advantages will become apparent from the following description and disclosure.

SUMMARY OF THE INVENTION

The invention relates to an improved reducing duct composed of sheet metal for the transfer of gaseous material between pipes of different internal diameter and/or shape. Accordingly the present invention is a unitary joint adapted for union between piping of ovate and annular contour as well as between pipes of the same shape but of different diameters. The present duct comprises an end portion representing substantially at least ⅜ the length of the duct and defined as an annular, inwardly tapered and fluted or corrugated section and an opposite end portion of an annular non-corrugated vertical section, said sections integrally united in a continuous manner through an intermediate annular reinforcement ring. Substantially ⅛ to about ¼ of the corrugated section at its free end is preferably non-tapered to simplify subsequent alignment and mounting of a pipe having a smaller diameter than a pipe ostensibly mounted at the opposite end of the duct.

DESCRIPTION OF THE DRAWINGS

The accompanying drawings are incorporated to illustrate a preferred embodiment but are not to be construed as limiting to the scope of the invention as defined the accompanying claims.

FIG. 2 is a frontal side view of the duct product aligned with pipes of different internal diameter illustrated by broken line.

DETAILED DESCRIPTION OF THE INVENTION

Figure 1:
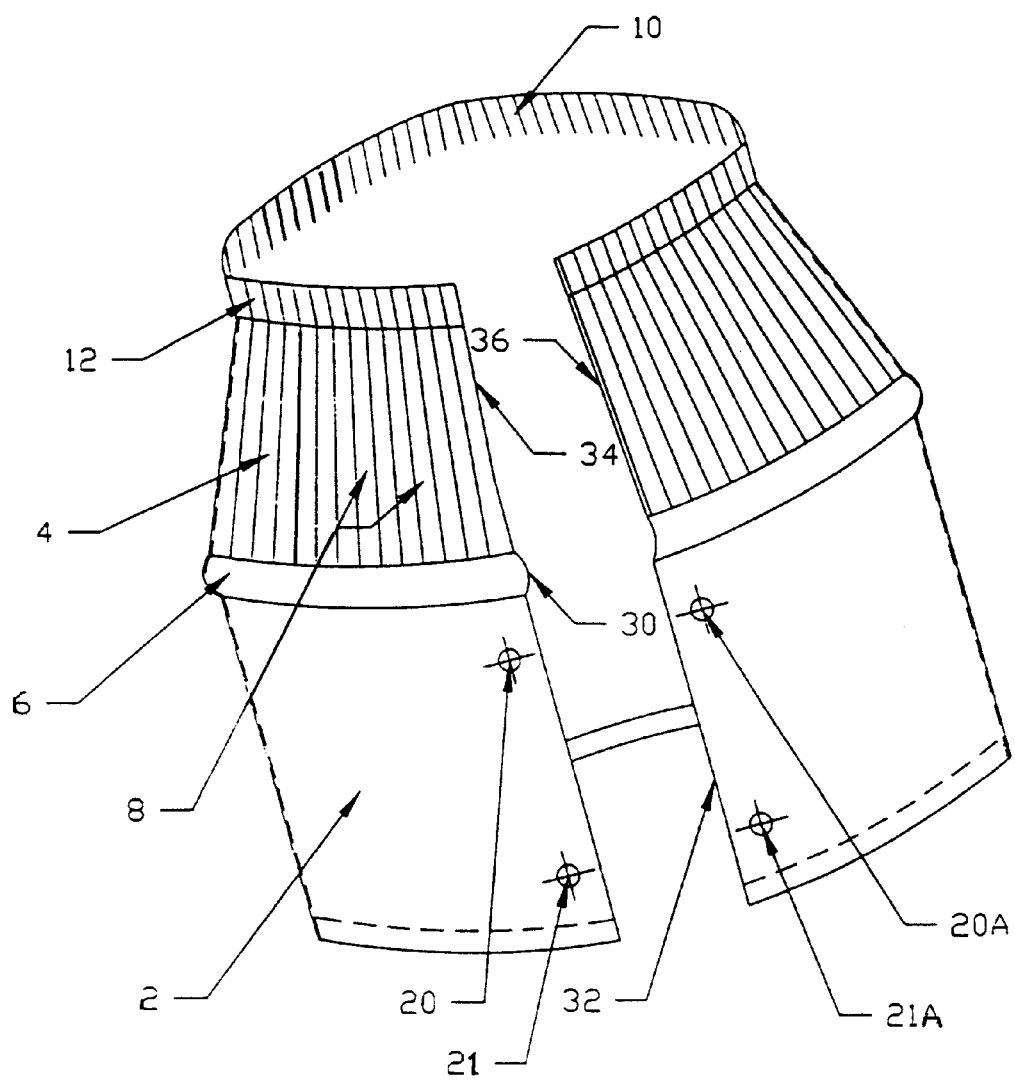
FIG. 1 is a perspective view of the novel duct template before joining side sections 30 and 31 of collar 2 and 34 and 36 of reduction section 4.

The corrugated reduction section of the present invention, preferably having a length substantially from ½ to ¾ the length of the duct, not only provides linear flow of fluid material but also provides flexibility which can be adapted by compression to accommodate various degrees of reduction in accordance with a wide range of piping diameters. The vertical annular exit portion of the corrugated section can be crimped around its periphery to limit the extent of overlapping when the pipe of smaller diameter is joined thereto. Further, the crimping permits axial rotation of the joined members after locking in place, in cases when such rotation is needed or desired. The corrugations are uniformly spaced between about ¹⁄₁₆ and about ⁵⁄₁₆ inch distance, preferably substantially from ⅛ to ¼ inch distance, valley to valley.

Referring to FIG. 1, there is shown the unitary duct template before joining side section 30 to 32 of collar section 2 and joint 34 to 36 of reduction section 4. In this embodiment, side sections 30 and 32 are overlapped and secured by rivets through apertures 20, 20A, 21 and 21A respectively. Similarly and simultaneously side sections 34 and 36 are overlapped and secured. Other suitable means of fastening may be used including rivets, adhesives or compression.

The template comprises collar section 2 integrally and continually joined to reduction portion 4 through reinforcing ring 6. The reduction portion 4, except for the vertical annular exit portion 12, is tapered inwardly from reinforcing ring 6. The entire reduction portion is similarly corrugated around its circumference as shown by uniform corrugations 8. The reduction duct may be of any suitable metal or plastic.

The vertical annular exit portion 12 is crimped or of a reduced circumference to limit the extent of overlapping by a second pipe and permits snap-on attachment for assembly of a joint to the piping of smaller dimensions. This vertical portion also provides for axial rotation of the joint or attached piping when locked in place.

The reinforcing ring 6 is adapted to secure the collar 2 and the reduction portion.

Referring to FIG. 2, there is illustrated a unitary annular reduction duct 1 having an overall dimension of substantially 6 inches and having a vertical collar section 2 contiguously joined in continual construction to reduction portion 4 through annular reinforcing ring 6. Approximately ½ the height of duct 1 carries a plurality of inwardly tapered corrugations 8 which comprise the reduction portion of duct 1. About ¼ inch of peripheral free end portion 10 of section 4 is bent vertically and describes the vertical annular exit portion 12 over which pipe 14 (indicated by broken line) of the smaller diameter is suitably mounted in alignment with pipe 16 (also shown in broken line) of larger diameter.

The inner surface of pipe 16 is fitted over the outer surface of collar 2, when assembled. The reinforcing ring may also be used to limit the extent of overlapping by pipe 16.

The length of the corrugation provides the flexibility to accommodate different types of piping and provides a more linear flow of fluid passing through the duct.

Many alterations and substitutions can be made in the preferred embodiments shown in the above figures without departing from the scope of this invention. For example any combination of measurements involving the reduction, collar and overlapping sections can be substituted in the ducts shown in the drawings.

What is claimed is:

1. A unitary annular reduction duct suitable for joining pipes of dissimilar diameter comprising:
   an annular entrance collar section of a given diameter;
   a corrugated and gradually inwardly tapered reduction portion contiguous with the collar section;
   a corrugated, substantially vertical annular exit portion contiguous with said reduction portion having a diameter less than that of said collar section.

2. The duct of claim 1 wherein said reduction and exit portions comprise substantially at least ⅜ the overall length of said duct.

3. The duct of claim 1 wherein said reduction portion and said exit portion together comprise from about ½ to about ¾ the length of said duct.

4. The duct of claim 1 wherein the length of said exit portion comprises from about ⅛ to about ⅜ that of said reduction portion.

5. The duct of claim 1 wherein the annular entrance collar is integrally and continuously united to the reduction portion through an annular reinforcing ring.

6. The duct of claim 1 wherein the corrugations are uniformly spaced by a distance of substantially between 1/16 and 5/16 inch valley to valley.

7. The duct of claim 1 wherein the corrugations are substantially uniformly spaced ⅛ to ¾ inch valley to valley.

8. The duct of claim 1 wherein the outer annular surface of said annular entrance collar is adapted to be mounted in underlapping manner and in abutment to the inner surface of a pipe having a given diameter.

9. The duct of claim 1 wherein the outer annular surface of said corrugated exit portion is adapted to be mounted in underlapping manner and in abutment to the inner surface of a pipe having a smaller diameter than the pipe of given diameter.

* * * * *